United States Patent
Zhang

(10) Patent No.: US 12,175,219 B2
(45) Date of Patent: Dec. 24, 2024

(54) METHOD AND APPARATUS FOR COMPILING DIFFERENTIAL-ORDER LOGIC EXPRESSIONS, ELECTRONIC DEVICES, AND STORAGE MEDIUM

(71) Applicant: Yinsheng Zhang, Beijing (CN)

(72) Inventor: Yinsheng Zhang, Beijing (CN)

( * ) Notice: Subject to any disclaimer, the term of this patent is extended or adjusted under 35 U.S.C. 154(b) by 0 days.

(21) Appl. No.: 18/639,132

(22) Filed: Apr. 18, 2024

(65) Prior Publication Data

US 2024/0281227 A1 Aug. 22, 2024

Related U.S. Application Data

(63) Continuation of application No. PCT/CN2024/072678, filed on Jan. 17, 2024.

(30) Foreign Application Priority Data

Jan. 18, 2023 (CN) .......................... 202310096154.4

(51) Int. Cl.
| | |
|---|---|
| G06F 9/44 | (2018.01) |
| G06F 8/41 | (2018.01) |
| G06F 9/445 | (2018.01) |
| G06F 9/455 | (2018.01) |

(52) U.S. Cl.
CPC .............. *G06F 8/41* (2013.01); *G06F 8/427* (2013.01); *Y02D 10/00* (2018.01)

(58) Field of Classification Search
CPC ............ G06F 8/40; G06F 8/427; Y02D 10/00
See application file for complete search history.

(56) References Cited

U.S. PATENT DOCUMENTS

| | | | | |
|---|---|---|---|---|
| 2020/0242146 | A1* | 7/2020 | Kalukin | G06F 16/3329 |
| 2022/0083740 | A1* | 3/2022 | von der Heyde | G06F 40/30 |

(Continued)

FOREIGN PATENT DOCUMENTS

| | | | | |
|---|---|---|---|---|
| CN | 111752566 A | * | 10/2020 | ............ G06F 8/427 |
| CN | 111880777 A | * | 11/2020 | |

(Continued)

OTHER PUBLICATIONS

Rijnard van Tonder, Towards Fully Declarative Program Analysis via Source Code Transformation, 2021, pp. 1-7. chrome-extension://efaidnbmnnnibpcajpcglclefindmkaj/https://arxiv.org/pdf/2112.12398 (Year: 2021).*

(Continued)

*Primary Examiner* — Mongbao Nguyen
(74) *Attorney, Agent, or Firm* — WPAT, P.C

(57) ABSTRACT

Provided are a method, an apparatus, an electronic device, and a computer-readable storage medium for compiling differential-order logic expressions (DOLEs), which relate to logic programming. The method, with the art such as any apparatus, electronic device, and computer-readable storage medium representing and implementing the method, includes obtaining an object language to be compiled, selecting symbol sequences of reference from the object language as lexemes according to the domain of terminal symbols specified by a lexical model, building a syntax model for the lexemes to make up differential-order logic propositions (DOLPs), and parsing the lexemes to output a result which is either a DOLP or certain interruption information in the compiling. A DOLP is either of low order or of high order. The method and its artifacts implement recognizing and generating the DOLEs, which cannot be recognized and generated by the prior art.

14 Claims, 9 Drawing Sheets

(56) References Cited

U.S. PATENT DOCUMENTS

| | | | |
|---|---|---|---|
| 2023/0059494 A1* | 2/2023 | Hunter | G06F 40/279 |
| 2023/0325157 A1* | 10/2023 | Hurley | G06F 8/40 |
| | | | 717/136 |

FOREIGN PATENT DOCUMENTS

| | | | | |
|---|---|---|---|---|
| CN | 113508385 A | * | 10/2021 | G06F 8/425 |
| CN | 114138641 A | | 3/2022 | |
| CN | 114611500 A | | 6/2022 | |
| CN | 115543330 A | * | 12/2022 | G06F 17/11 |

OTHER PUBLICATIONS

English translation Duan (CN 115543330 A), 2022, pp. 1-23. (Year: 2022).*

Craymer (CN 113508385 A), 2021, pp. 1-25 (Year: 2021).*

Jinjiang Xing, The Unified Scheduling Language Designed for the Space Mission Scheduling Platform, 2016, pp. 1-17. https://ieeexplore.ieee.org/stamp/stamp.jsp?tp=&arnumber=7500602 (Year: 2016).*

Yuting Wang, A Higher-Order Abstract Syntax Approach to the Verified Compilation of Functional Programs, 2017, pp. 1-261. chrome-extension://efaidnbmnnnibpcajpcglclefindmkaj/https://arxiv.org/pdf/1702.03363 (Year: 2017).*

Elizabeth Polgreen, SynRG: Syntax-Guided Synthesis of Expressions with Arrays and Quantifiers, 2020, pp. 1-24. chrome-extension://efaidnbmnnnibpcajpcglclefindmkaj/https://arxiv.org/pdf/2007.10519 (Year: 2020).*

English translation, Cheng (CN 111752566 A), 2020, pp. 1-10. (Year: 2020).*

English translation, Dong (CN 111880777A), 2020, pp. 1-15. (Year: 2020).*

* cited by examiner

| Semantic classification tokens | | | | Semantics |
|---|---|---|---|---|
| Parameters of different -order logic expressions | Different - order logic expressions | | FOt | first-order term |
| | | | Const-FOt | constant first-order term |
| | | | Var-FOt | variable first-order term |
| | | | SOT | second-order term |
| | | | Const_SOT | constant second-order term |
| | | | Var_SOT | variable second-order term |
| | | | TOT | third-order term |
| | | | Const-TOT | constant third-order term |
| | | | Var-TOT | variable third-order term |
| | | | FOp | first-order predicate |
| | | | Const-FOp | constant first-order predicate |
| | | | Var-FOp | variable first-order predicate |
| | | | SOP | second-order predicate |
| | | | Const-SOP | constant second-order predicate |
| | | | Var-SOP | variable second-order predicate |
| | | | TOP | third-order predicate |
| | | | Const-TOP | constant third-order predicate |
| | | | Var-TOP | variable third-order predicate |
| | | Type of propositions of differential order logic | FO-ATOM | atomic first-order proposition |
| | | | FO-Composition | composite first-order proposition |
| | | | SO-ATOM | atomic second-order proposition |
| | | | SO-Composition | composite second-order proposition |
| | | | TO-ATOM | atomic third-order proposition |
| | | | TO-Composition | composite third-order proposition |
| | Quantifier | | Q | quantifier |
| | | | $Q^{(1)}$ | first-order quantifier |
| | | | $Q^{(2)}$ | second-order quantifier |
| | | | $Q^{(3)}$ | third-order quantifier |
| | Logical operator | | ↑ | logical operator of monadic arity |
| | | | ↓ | logical operator of dyadic arity |
| | Formal parameter of identifier | | Identifier | identifier |

FIG. 2

| Declarator of type of DOLE | Semantics |
|---|---|
| D_FOt | Declaration tag of first-order term |
| D_SOT | Declaration tag of second-order predicate |
| D_TOT | Declaration tag of third-order term |
| D_Q | Declaration tag of quantifier |
| D_FOp | Declaration tag of first-order predicate |
| D_SOP | Declaration tag of second-order predicate |
| D_TOP | Declaration tag of third-order predicate |

FIG. 3

"(" Q-FOt, Q-SOT, ")", Q-SOP, "(" FOt, SOT, ")"

↓ ↓ ↓ ↓ ↓ ↓ ↓ ↓ ↓

( $\overline{\top}x$  $\exists X$  )  $\forall P$  (  x ,  X  )

FIG. 4

| $Q^{(n+1)} * Q^{(n)}$ | | $Q^{(n)}$ | | |
|---|---|---|---|---|
| | | $\overline{\top}$ | $\forall$ | $\exists$ |
| $Q^{(n+1)}$ | $\overline{\top}$ | $\overline{\top}$ | $\overline{\top}$ | $\overline{\top}$ |
| | $\forall$ | $\overline{\top}$ | $\forall$ | $\exists$ |
| | $\exists$ | $\overline{\top}$ | $\exists$ | $\exists$ |

FIG. 5

| $(\neg Q^{(n+1)}) * Q^{(n)}$ | | $Q^{(n)}$ | | |
|---|---|---|---|---|
| | | $\top$ | $\forall$ | $\exists$ |
| $\neg Q^{(n+1)}$ | $\neg\top$ | $\top$ | $\forall$ | $\exists$ |
| | $\neg\forall$ | $\top$ | $\top$ | $\top$ |
| | $\neg\exists$ | $\forall \mid \neg\exists$ | $\top \mid \neg\exists$ | $\neg\exists$ |

FIG. 6

| $(\neg Q^{(n+1)}) * (\neg Q^{(n)})$ | | $\neg Q^{(n)}$ | | |
|---|---|---|---|---|
| | | $\neg\top$ | $\neg\forall$ | $\neg\exists$ |
| $\neg Q^{(n+1)}$ | $\neg\top$ | $\forall \mid \neg\exists$ | $\top \mid \neg\exists$ | $\neg\exists$ |
| | $\neg\forall$ | $\top \mid \neg\exists$ | $\top \mid \neg\exists$ | $\top$ |
| | $\neg\exists$ | $\top$ | $\forall$ | $\exists$ |

FIG. 7

| $Q^{(n+1)} * (\neg Q^{(n)})$ | | $\neg Q^{(n)}$ | | |
|---|---|---|---|---|
| | | $\neg\top$ | $\neg\forall$ | $\neg\exists$ |
| $Q^{(n+1)}$ | $\top$ | $\forall \mid \neg\exists$ | $\top \mid \neg\exists$ | $\exists \mid \neg\exists$ |
| | $\forall$ | $\forall \mid \neg\exists$ | $\top \mid \neg\exists$ | $\neg\exists$ |
| | $\exists$ | $\exists \mid \neg\exists$ | $\top \mid \neg\exists$ | $\exists \mid \neg\exists$ |

FIG. 8

| Lexeme | Semantic classification token | Semantics |
|---|---|---|
| ∀,∃ | Q | quantifier |
| ∧,→,\|,= | ↓ | logical operator of dyadic arity |
| 0,1,2,3 | DIGITAL | integer number |
| π | ALPHABETIC CHARACTER | constant |
| (,),{,} | ASCII | separator |
| d,l,r L, R, D, i, j, k, Plus, Tri, TriSet, Action | Identifier | identifier |

FIG. 9

| Lexeme | Type of predicate or term | Semantics |
|---|---|---|
| d,l,r | Var-FOp | variable first-order predicate |
| Plus | Const-FOp | constant first-order predicate |
| i,j,k | Integer-Expression | variable first-order integer term |
| L,R,D, Tri | Var-SOT- | variable second-order predicate |
| Action, TriSet | Const-SOT | constant second-order predicate |

FIG. 10

| Lexemes or mediating symbols (input for bottom-up, or output of top-down) | Maps in model of syntax in EBNF | Types of predicate statement and DOLP types (input for top-down, or output of bottom-up) | Semantics |
|---|---|---|---|
| d(i), d(j), d(k), | FOp-Statement-Pure (See (4)) | FOp-Statement-Pure | Quantifier-free first-order predicate statement |
| l(d (1), d(2)) | | | |
| r(l(d(i), d(j)), l(d(j), d(k))) | | | |
| Plus(r(l(d(i), d(j)), l(d(j),d(k))), r(l(d(j), d(k)),l(d(k),d(i)))) | | | |
| Plus( r(l(d(i), d(j)), l(d(j),d(k))), r(l(d(j),d(k)),l(d(k), d(i)))=2π | FO-Composition-Pure (See (15)) | FO-Composition-Pure | Quantifier-free composite first-order DOLP |
| Plus(r(l(d(i),d(j)), l(d(j),d(k))), r(l(d(j),d(k)), l(d(k),d(i)))=2π) →Tri(l,r,d) | | | |
| (∃l∃r∃Tri)((Plus(r(l(d(i),d(j)), l(d(j),d(k))), r(l(d(j),d(k)), l(d(k), d(i)))=2π)→Tri(l,r,d) | SO-Composition-Q (See(17)) | SO-Composition-Q | Quantified composite second-order DOLP |
| SO-Composition-Q | SO-COMPOSITION (See (16)) | SO-COMPOSITION | Composite second-order DOLP |
| (∀L∀R∃D) (TriSet(L, R, D) →Action(D)) | TO-Composition-Q (See (19)) | TO-Composition-Q | Quantified composite second-order DOLP |
| TO-Composition-Q | TO-COMPOSITION (See (18)) | TO-COMPOSITION | Quantified composite third-rder DOLP |
| ∃D Action(D) | TOP-Statement-Q (See (12)) | TOP-Statement-Q | Quantified atomic third-order DOLP |

FIG. 11

|  | Differential-order quantifier | Quantified predicate | | | |
|---|---|---|---|---|---|
| Pre-decreasing order | $Q^n$ | $\exists Tri$ | $\exists l$ | $\exists r$ | $\exists d$ |
|  | $Q^{n+1}$ | TriSet | $\forall L$ | $\forall R$ | $\exists D$ |
| Decreasing order |  |  | $\forall * \exists \rightarrow \exists$ | $\exists * \exists \rightarrow \exists$ | |
| Post-decreasing order | $Q^n$ | $\exists Tri$ | $\exists l$ | $\exists r$ | $\exists d$ |

FIG. 12

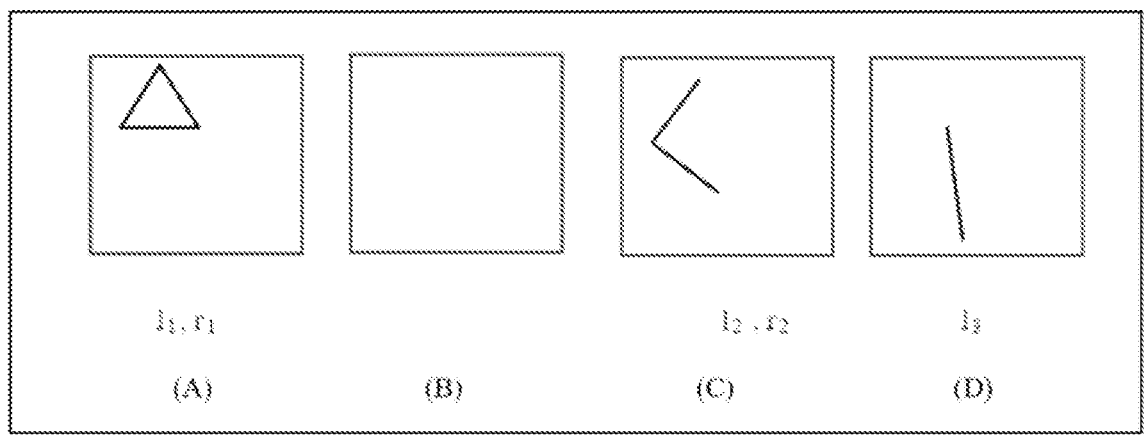

FIG. 13

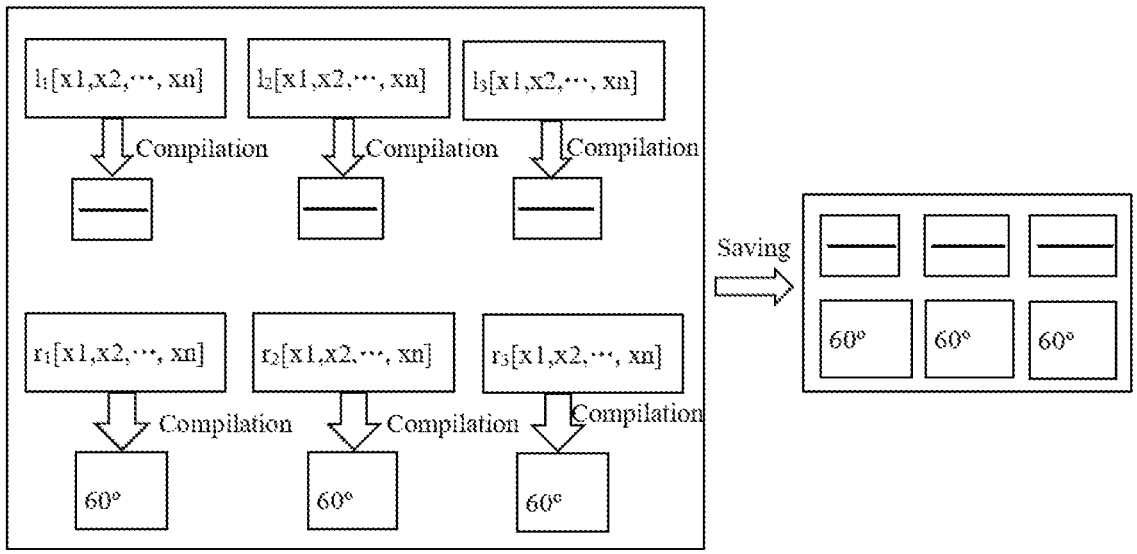
FIG. 14-A
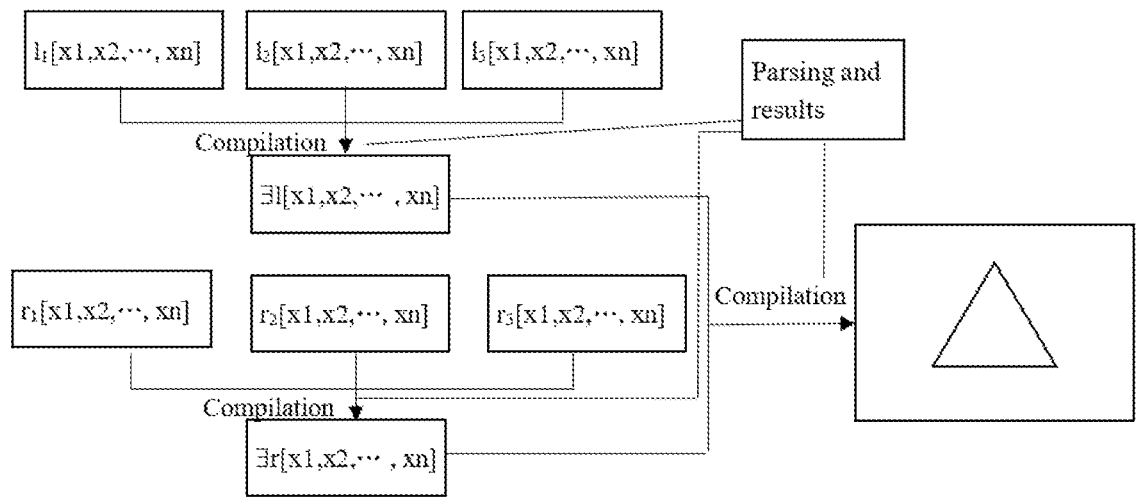
FIG. 14-B

METHOD AND APPARATUS FOR COMPILING DIFFERENTIAL-ORDER LOGIC EXPRESSIONS, ELECTRONIC DEVICES, AND STORAGE MEDIUM

TECHNICAL FIELD

The present disclosure relates to the field of logic programming, specifically entailing compiling differential-order logic expressions (DOLEs) by means of embodiments of a method, an apparatus, an electronic device, and a computer-readable storage medium.

BACKGROUND

Early, logic programming languages implement deductions of knowledge in formal languages through processing first-order logic (FOL) expressions. Typically, mathematical logic calculi, automatic proofs of theorems, problem solving, and expert systems etc. are applications of logic programming languages, which run by compiling logical expressions.

However, basically narrowed to FOL, and slightly based on high-order logic (HOL)—for the latter case, parameters of FOL and HOL are not integrally complied in one compiling environment, logical expressions with different orders (viz. with differential orders) are not compiled in one compilation system in the existing compilation techniques. For example, logical expressions of terms or predicates with quantifiers of both FOL and HOL cannot be compiled.

SUMMARY

The embodiments of the present disclosure deliver a method, an apparatus, an electronic device and a computer-readable storage medium for compiling DOLEs, which can overcome the limitations incapable of compiling the DOLEs in the existing logic programming languages.

The method comprises:
obtaining an object language to be compiled, and selecting a symbol sequence of reference from the object language as lexemes according to a domain of terminal symbols specified by a preset lexical model; and
applying a syntax model to parse the selected lexemes to output results which are either a differential-order logic proposition (DOLP) purely composed of terminal symbols or certain interruption information in compiling. The DOLP is at least one of a low-order DOLP and a high-order DOLP. In some embodiments, the low-order DOLP is a first-order logic (FOL) proposition, and the high-order DOLP is a second-order or higher-order logic proposition.

In addition to the method, an apparatus with the following modules is designed, which comprises:
a selection module, applied to obtain an object language to be compiled, and select a symbol sequence of reference from the object language as lexemes according to a domain of terminal symbols specified by a preset lexical model;
a parser module, applied to parse the lexemes to output results which are either a DOLP made up of terminal symbols or certain interruption information in compiling; the DOLP is at least one of a low-order DOLP and a high-order DOLP. The low-order DOLP is a FOL proposition, and the high-order DOLP is a second-order or higher-order logic proposition. The selection module and the parser module are software modules embedded and/or saved in one or more storage mediums and executable by one or more processors.

In addition to the method, an electronic device is also provided by the embodiment of the present disclosure, comprising a storage medium with programs, and a processor, the processor is configured to implement the steps described in the method by means of running the programs.

In addition to the method, a computer-readable storage medium (generally non-transitory) is provided too. The computer-readable storage medium saves programs, lexical models and syntax models to realize the method.

A computer program product is provided by the embodiment of the present disclosure, whose programs implement the steps described in the method as the processors run the programs.

The beneficial effects of applying the embodiments of the present disclosure are expected in that: the embodiments obtain object language, select a symbol sequence of reference from the object language as lexemes according to a domain of terminal symbols specified by a preset lexical model, and parse the lexemes to output results which are either a DOLP made up of terminal symbols or certain interruption information in compiling; the DOLP is at least one of a low-order DOLP and a high-order DOLP. Therefore, the embodiments are expected to overcome the defects incapable of compiling DOLE in one compiling environment for the existing logic programming languages.

BRIEF DESCRIPTION OF DRAWINGS

In order to illustrate the embodiments of the present disclosure or technical schemes in the prior art more clearly, the accompanying drawings are briefly introduced bellow.

FIG. 2 is a form of the semantic classification tokens applied in lexical analyzing or syntax parsing in using the method of compilation, with semantics, exemplified by an embodiment of the present disclosure.

FIG. 3 is declaration tags (declarator) of type of DOLE in using the method of compilation, with semantics, exemplified by an embodiment of the present disclosure.

FIG. 4 is a transformation from a differential-order logic proposition expression (DOLPE) to terminal symbols in using the method of compilation, exemplified by an embodiment of the present disclosure.

FIG. 5 is a form of a comparison between prior to and post decreasing order of a differential-order logic (DOL) quantifier in using the method of compilation, exemplified by an embodiment of the present disclosure.

FIG. 6 is a form of a comparison between prior to and post decreasing order of a differential-order logic (DOL) denied quantifier in using the method of compilation, exemplified by an embodiment of the present disclosure.

FIG. 7 is a form of a comparison between prior to and post decreasing order of a differential-order logic (DOL) denied quantifier in using the method of compilation, exemplified by an embodiment of the present disclosure.

FIG. 8 is a form of a comparison between prior to and post decreasing order of a differential-order logic (DOL) denied quantifier in using the method of compilation, exemplified by an embodiment of the present disclosure.

FIG. 9 is a form of the mappings between lexemes and their semantic classification tokens in using the method of compilation, exemplified by an embodiment of the present disclosure.

FIG. 10 is a form of the mappings between lexemes and types of predicates or terms in using the method of compilation, exemplified by an embodiment of the present disclosure.

FIG. 11 is a form of the mappings between lexemes or mediating symbols, differential-order logic proposition (DOLP) parameters (types of predicate statement) and DOLP types, exemplified by an embodiment of the present disclosure.

FIG. 12 is a form of a comparison between prior to and post decreasing order of a differential-order logic (DOL) in using the method of compilation, exemplified by an embodiment of the present disclosure.

FIG. 13 is an illustration of generating a graphic by different first-order logic (FOL) functions $(l_1,r_1,l_2,r_2,l_3)$ in a compilation device, exemplified by an embodiment of the present disclosure.

FIG. 14-A and FIG. 14-B are the illustrations of comparison compiling a DOLE. Wherein, FIG. 14-A gives knowledge representations (a set of angle functions {r} and a set of lines functions {l}) with the compilation module and the compiled results, which are carried out by the prior art by the existing principles; FIG. 14-B gives a fuzzy set knowledge $(\forall L \forall R \exists D)(TriSet(L,R,D))$ based on {r} and {l}, with the compilation module and the compiled results, which is an embodiment delivered by the present disclosure. Wherein, L={l}, R={r}, V is the universal quantifier like "all", $\exists$ is the existential quantifier like "exists", and D is a judgement of features of a triangle.

DETAILED DESCRIPTION OF EMBODIMENTS

Figure 1:
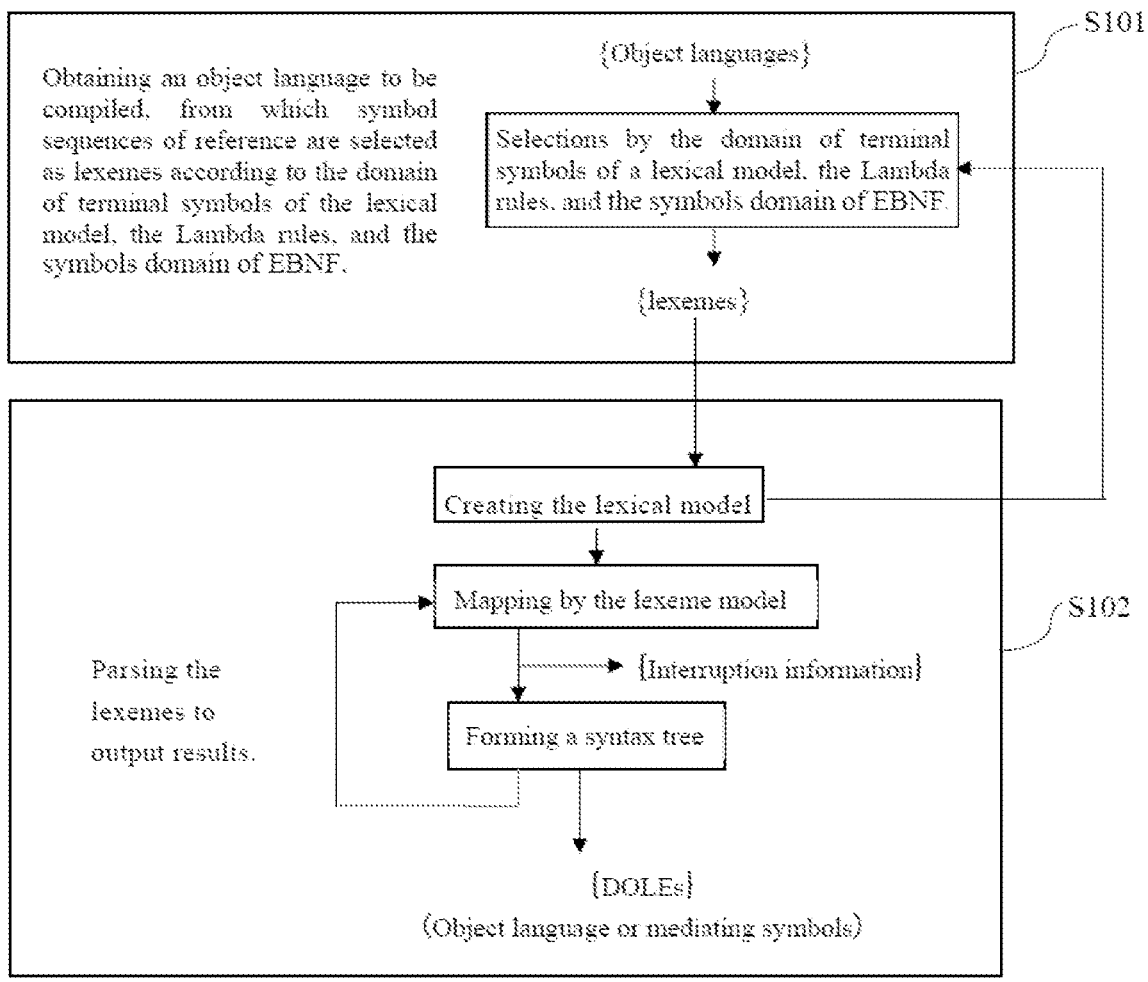
FIG. 1 is a flowchart of the method compiling a differential-order logic expression (DOLE), provided by an embodiment of the present disclosure.

An embodiment of the present disclosure is described as following. It should be noted that the drawings are only illustration, which does not constitute a limitation for the scheme.

In order to show the present disclosure more clearly, an explication goes follows.

Some terms used in the present context are explained as follows with exception of a specific notation.

The binders "a" may include the plausible form or meaning when it comes with multiple cases. The terms "comprise", "contain", "include" mean the items whose features are capable of being generalized in the subject, or referred to as information, data, process(es), operation(s), unit(s) or component(s), and any combination of the former ones. However, other items whose features are similar with the former ones, supported by the present disclosure, are not ruled out.

The term "and/or", "or/and" refer to at least one of the referred items. For example, "A and/or B" may instantiated as either "A and B" or that of "A" or "B".

"Mapping relation" means the bidirectional relation (ship). A "mapping relation between A and B" means that either "A is in mapping to B" or "B is in mapping to A". This is to say, in the top-down view, the mapping relation between A and B indicates "A is in mapping to B", articulating an element A is in mapping to (commonly, a set) B; in contrast, in the bottom-up view, the mapping relation between A and B indicates "B is in mapping to A", articulating (a set) B is in mapping to (an element) A. Thereby, a mapping relation is like a relation between a father node and child node(s) in a tree, but which one of A and B is a father or a child is not specified or given yet. When a mapping is between double singletons, the mapping is a one-one mapping relation; when a mapping set with one or two empty relatives, the corresponding operation of the mapping will output interruption information.

"Quantified" means the feature specifying the quantity as the binder on the variable.

"Basic quantifiers" means one or more of the existential quantifier "exists" ($\exists$), the universal quantifier "all" ($\forall$) and the partial quantifier $\top$ ("exists but not all").

"Expression" is regarded as the symbols subjected to a lexical model or a syntax model. It mostly means mediating symbols; however, it might be terminal symbols too in some given specific contexts that the terminal symbols are in mapping relations with mediating symbols.

The terms "set" and "individual" all refer to objects of operation of machines, hence they should not be understood as only pure mathematical conceptions. The meaning and semantics are explained as follows.

A nonempty "set" means a collection of one or more digital objects such as pixels, characters, files, signals, etc., possessing one common physical characteristic (like one block of an address etc., . . . ).

An individual means one element of a set.

"Parameter" is a semantic or syntax unit to compose a part of a machine instruction or a proposition. A parameter might be a constant parameter, or a variable parameter.

"Differential-order logic" (DOL) is defined as a logic which can be interpreted by a machine computing system. "Order" is a well-known term in logic, which is referred in "first order", "second order", and further "high order": when a predicate in proposition functions on only an individual, then, the proposition, the predicate and the individual in the proposition, are all called "of first-order"; when on a set, "of second-order"; and on set of set, "of third-order", etc. Basically, second even higher orders are called "high order". A logic treating a certain order is called the corresponding-order logic. "Differential-order logic", which is introduced in this application context, represents the logic between two serial orders, or one of the two, for example, between first and second orders, between second and third orders, or formulized as between n and n+1 orders, and/or one of the mentioned pairs. As "set" and "individual" are all objects for machine operations, differential-order logic in terms of "set" and "individual" is oriented to machines too.

"Differential-order logic expression(s)" (DOLE) is defined as the expressions which represent differential-order logic relating to the expressions. In some specific cases, a certain order of DOLE is given, then the certain order may serve as the binder of the DOLE. For example, by "first-order DOLE" we mean a DOLE that possesses a maximum order, first-order, so is "second-order DOLE" for the maximum order of second order, etc.

"Differential-order logic programming language" is viewed as the logic programming languages which include DOLEs.

Representing and deducting knowledge in programming languages is a goal early set by artificial intelligence (AI). Here, "knowledge" is classified as a kind of logic statements which own a truth for confirmation or checking, viz, as the representation in terms of propositions.

For achieving the goal, knowledge compilation is desired for recognizing or organizing the accepted symbols (like lexemes) as units (knowledge organs) to constitute a knowledge representation—a form of propositions. The reference:

Hélène Fargier and Pierre Marquis, Disjunctive closures for knowledge compilation, Artificial Intelligence, 216(2014) 129-162, has summarized the advances of knowledge compilation. Analyzing the existing knowledge compilation techniques through the reference in particular, the present inventor has found that the early logic programming languages such as Lisp, Prolog primarily make their compilations on only first-order logic (FOL) expressions. Recently, say, up to the date when the present application is to be lodged at the end of 2023, the existing logic programming languages still mainly treat FOL, and although some logic programming languages such as Isabelle/HOL and Cog treat high-order logic (HOL), but on a limited scale. For example, the following kinds of expressions of HOL are not treated by Isabelle/HOL and Cog: quantified predicates (function symbols) and their calculi on the quantifiers, complexes of quantified predicates and quantified terms, and complexes of FOL and HOL variables (terms, predicate and quantifiers) in one expression. Summarily, DOLEs cannot be compiled in the existing compilers. The embodiment of the present disclosure delivers a method and its hard artifacts, which can go beyond these limitations described in the reference, and of the prior art.

The present inventor has learned that the early logic programming languages such as Lisp and Prolog narrow their knowledge compilations on only FOL expressions with their operations, neglecting high orders, such that compilers of FOL programming languages function on a limited scale, and with a lower effectiveness. The evolved logic programming languages like Issabella/HOL and Coq treat HOL expressions, including second-order expressions, but the grammars treating HOL are simple, leaving many HOL expressions not compiling. For example, many HOL expressions are not formalized, such that second-order expressions like quantified predicates cannot be recognized and/or generated; besides, relations between the first- and second-order quantifiers cannot be calculated. Primarily, the existing compilers of logic programming languages cannot recognize and represent wide DOLEs and make their accompanying operations.

The embodiments of the present disclosure aim to solve the problems incapable of compiling DOLEs in the prior art and in the techniques described in the reference (Hélène Fargier and Pierre Marquis) by means of providing a method, an apparatus, an electronic device and a computer-readable storage medium.

The embodiments of the present disclosure provide the method as illustrated in FIG. 1, which are capable of compiling logic languages based on differential logic. The method comprises (S101 to S102):

S101: Obtaining an object language to be compiled, from which symbol sequences of reference are selected as lexemes according to the domain of terminal symbols specified by a lexical model.

The domain of terminal symbols is set by processes which comprise rules of Lambda languages and the forms of Extended Backus-Naur Form (EBNF).

A Lambda language is a prototype language of logic programming, which is capable of describing formal structures of a goal language. Meanwhile, a Lambda language also specifies classifications of the domain of terminal symbols (which can be transformed into the data type of a programming language). EBNF is a set of symbols, which specifies a symbol domain. Therefor the rules of Lambda languages and the local domain of the symbols of EBNF are used in specifying the terminal symbols of a lexical model. The domain as a restriction is saved in a storage medium to be given prior to or in the processing of compiling. The domain of terminal symbols is specified by the semantic classification tokens which accept terminal symbols in the terms of the mapping relations between the semantic classification tokens and the terminal symbols in a lexical model. In other words, any element in the set of semantic classification tokens serves as a relative in a relation with the domain of terminal symbols, or with other semantic classification tokens.

In the embodiments of the present disclosure, as a symbol sequence in an object language satisfies both the Lambda language and the EBNF, and falls into the domain of terminal symbols, the symbol sequence becomes a reference sequence, viz. the lexemes, which are the smallest units in a syntax model, and not dissected for inner semantics or substructures.

S102: Parsing the lexemes to acquire results.

Wherein, the results comprise a DOLP or interruption information; and the DOLP is one of either low-order DOLP or high-order DOLP.

The results are applied to a computer, and executed by a computer's compiler or its improved modules which are nested in a machine system as the meta-data structure, relating to the hardware as any compiler's relating the hardware. That is, the computer outputs the results to expand knowledge representations and improve processing ability of the computer's compilers, i.e., improving and enhancing the computing functioning of machines.

Specifically, the embodiment of parsing lexemes to acquire a result is based on a syntax model.

The syntax model is meta-data structures, which structurally represents types of DOLP. In the light of the types of DOLP, the parsing refers terminal symbols in an object language to a differential-order logic proposition expression (DOLPE), therefor the symbols under the reference of the type of DOLP become a new data structure generated from the meta-data structure, completing a compilation of a DOLP; if the syntax model fails in parsing the terminal symbols to a DOLPE, for example, to only one parameter of the type of DOLP, not sufficiently covering an intact structure of the type of DOLP, then it acquires interruption information.

A DOLP is one of either low-order DOLP or high-order DOLP. Therefore, the embodiments of the present disclosure have solved the problems that the prior art cannot recognize and further compile expressions of first-order logic (FOL), second-order logic (SOL) and high-order logic (HOL), i.e., of differential-order logic (DOL) coexisting in a language.

The embodiments of the present disclosure provide a technical scheme parsing the lexemes to acquire a result. The technical scheme includes (S201 to S205):

S201: Creating a set of semantic classification tokens to provide mapping relations between the semantic classification tokens and between semantic classification tokens and lexemes.

The semantic classification tokens are set in terms of primary compositions of a proposition, including parameters of expressions, formal parameters of identifiers (see FIG. 2), and declarators of a type of DOLE (see FIG. 3). The parameters of expressions include logical operators, quantifiers, and types of expressions (including DOLP types and data types (like const and var, viz. the symbols of a constant and a variable).

The semantic classification tokens constitute mediating symbols which neither belong to lexemes nor to terminal symbols, only serving as the expressions as the transformers from lexemes and terminal symbols.

S202: Building a syntax model, including establishing a set of mapping relations between the semantic classification tokens, as well as between the semantic classification tokens and the lexemes.

The syntax model describes mapping relations (with multiple layers) between types of DOLP and the lexemes with the help of description of the sets of semantic classification tokens. A step of building the syntax model is characterized in targeting the lexemes at a type of DOLP.

S203: Applying the syntax model to parse the lexemes: recognizing and/or generating mapping relations between the lexemes and the semantic classification tokens according to the syntax model, wherein the semantic classification tokens serve as mediating symbols possible to be parameters of a DOLP.

For input symbol sequences of reference—lexemes, the parsing executes a mapping between the lexemes and a corresponding token in the syntax model through replacing an antecedent with a consequent given in the mapping to generate a stepwise or final goal. A mapping is executed by means of replacing an antecedent to generate a corresponding consequent toward or ending at a goal. The replacement might be commonly run using compilation tools.

S204: Specifying a type of DOLPE by the semantic classification tokens and the parameters of DOLPE.

The type of DOLPE describes a formal structure of a DOLP, which comprises the types of atomic and composite DOLPs with first, second, and third orders, as illustrated in FIG. 2. For the types of atomic and composite DOLP with n, n+1, and n+2 orders, their forms may be remained as ones of the type of atomic and composite DOLPs with first, second, and third orders in the relations to the numbers of the orders with n, n+1, and n+2 orders.

Each type of DOLPE is composed of its parameters. For example, the type of second-order DOLPE, symbolized by SO-ATOM, owns a sub-type SOP-Statement-Q that is composed of parameters Var-FOt, Q, Var-FOp, SOT, SOP-Statement-Pure. Wherein, Var-FOt, symbolizes a variable first-order term; Q symbolizes a quantifier; Var-FOp symbolizes a variable first-order predicate; SOT symbolizes a variable second-order; and SOP-statement-pure symbolizes a predicate statement without quantifier.

S205: Transforming the types of DOLPE into terminal symbols, acquiring a DOLP or interruption information.

In a top-down transformation of expressions, the parameters of a type of DOLPE and the auxiliary symbols are transformed into terminal symbols, viz. lexemes, at which, therefore, ending for no expression else to be transformed according to the set of mapping relations which drives only mediating symbols to lexemes. The ending as a halt is specified as accomplishing a mapping between the types of DOLPE and the DOLP subjected to the type. An example is shown by FIG. 4, where the parameters of a sub-type of DOLPE—"SOP-Statement-Q": Q-FOt, Q-SOT, Q-SOP all transformed into the terminal symbols: (, $\top$, x, $\exists$, X,), $\forall$, P, (, x, X.), accomplishing the mapping between the sub-type of DOLPE and lexemes of the DOLP: ($\top$ x$\exists$X)$\forall$P(x,X), wherein, $\top$ x$\exists$ represents that the partial quantifier $\top$ and the existential quantifier $\exists$ bind the first-order and second-order terms x and X respectively, and the universal quantifier $\forall$ binds the predicate P. Like this example, a type of DOLPE drives a transformation until the terminal symbols replace all the mediating symbols representing the parameters of the type, as the mappings tour in the set of mapping relations, no interruption occurs, thereof the DOLP of the terminal symbols corresponding to the type of DOLPE is acquired as a parsed result.

In a bottom-up transformation of expressions, if the transformation has not reached a type of DOLP yet, then, the transformed expressions meeting the conditions of further mappings will proceed a transformation toward a type of DOLP. Reaching a type of DOLP means completing a compilation; if not reaching, it gives interruption information after completing retrieving the set of mapping relations.

The embodiments of the present disclosure offer a practicable means that the set of mapping relations in the syntax model represents parsing objects and the parsed results, and the elements of the set of mapping relations represent the mapping relations of DOLE.

A transformation of the types of DOLPE into terminal symbols to achieve a DOLP comprises (S301 to S302):

S301 Constructing a grammar tree based on the set of mapping relations; treating a type of DOLPE as a root node, and treating the related element(s) in mapping relations in the set of mapping relations, of the type of DOLPE as child nodes which include at least one of predicates, terms, quantifiers, types of DOLPE, and logic operators in representing or composing a DOLP.

S302 Completing a compilation of a DOLP, if the transformations of the mediating symbols started from a root node by the instructions of the set of mapping relations finally achieve required terminal symbols, or outputting interruption information if not, namely, the mappings run in the instructions cannot cover the required the DOLPE parameters specified by a type of DOLPE, or cannot cover the required semantic classification tokens or their corresponded terminal symbols.

In the embodiments of the present disclosure, the syntax model formally represents compositions of parameters of a DOLPE, and the parameters sufficiently cover the formal structure of a type of DOLPE such that the parameters, such as predicates, terms, quantifiers, of any type of DOLPE are included in the relatives of the set of mapping relations. Hence, the parameters can be covered by the child nodes of types of DOLPE.

The syntax model provides a tour such that the lexemes in mappings can proceed to a type of DOLPE by multiple mapping steps.

The embodiments of the present disclosure offer a practicable means that the elements in the set of mapping relations said in S203 represent the relations between DOLEs, which comprise at least one of declaration of DOLE, assignment of DOLE, and DOLPE:

Wherein, the declaration of DOLE is a linear structure made up of a declarator, a formal parameter of identifier, and\or other parameters of expressions, used in composing a relation between the formal identifiers and the other parameters of the expressions, listing the relation into the set of mapping relations for imparting attributions of the other parameters of the expressions occurred in the relation to the identifier, and representing the identifier equipped with the relation.

The assignment of DOL is a linear structure made up of the declared and user-input parameter(s) of DOLEs, an identifier, and an assignor. The assignment of DOL is used in listing the declared and user-input parameter(s) of DOLEs and the identifier into the set of mapping relations to substitute the assigned parameter(s) of the DOLEs for the identifier in parsing according to the mapping relations.

A DOLPE represents a structure and composition, thereof the structure optionally includes the atomic DOLPE or composite DOLPE; and the DOLPE fits forms of the Lambda language.

The set of mapping relations represent formal mapping relations between DOLEs, whose elements comprise at least one of declaration of DOLE, assignment of DOLE, and DOLPE.

A differential-order logic expression (DOLE) is an object prior or post the transformation. For top-down transformations, the prior expression (antecedent) is a sequence of mediating symbols, and the result of transformation (the post expression, i.e., the consequent) is a sequence of mediating symbols or/and terminal symbols. Mediating symbols include semantic classification tokens. Also, a DOLE possibly comprises ones generated by users' interaction coupled with tokens and/or terminal symbols (lexemes).

The DOLEs cover all the sequences of terminal symbols necessarily composing a type of DOLPE, enabling the type to cover and reach proper lexemes through one or multiple-step mappings.

The DOLEs comprise at least one of declaration of DOLE, assignment of DOLE, and DOLPE. The embodiments of the present disclosure offer a practicable, representative and generative means.

Wherein, the declaration of DOLE is a linear structure between a tag of type of DOLE and parameters of expressions including a formal parameter of identifier, so that the identifier and the type of DOLE form a mapping relation to be listed in the set of mapping relations.

Specifically, a declaration expression of a variable term with first order, as (1), is an example showing how to construct a declaration expression.

$$\text{Var}-FOt-\text{Declaration} = \text{Var}-FOt" = ", \text{var}, \text{D\_FOt}, \text{identifier}; \quad (1)$$

In (1), the declaration Var-FOt-Declaration represents a declaration method of a variable first-order term Var-FOt. The method places Var-FOt on the left of the declarator "=", and the tag of data type like var, the type tags of the declaration expressions like D_FOt and the identifier expression on the right. The expressions on the left and the right constitute a "linear relation" (by "linear relation" the relatives which are position-relative each other are meant), and are saved in a linear structure of storage, such that the identifier as if hallmarked as the declared type Var-FOt to be retrieved and called by the linear relation in the linear structure of storage in an application program. Var-FOt-Declaration is a part of the declaration expression (1), serving as the type of declaration expression. However, without Var-FOt-Declaration, the left ones (Var-FOt "=", var, D_FOt, identifier) are still remain working. The composition of a declaration expression can be simplified, for example, the declarator "=" may be omitted, and the positions of the sub-expressions may be different, but a declaration expression should comprise an identifier and declarator, and a tag of data type is commonly needed.

Declaring an identifier "computer_A" to be a second-order variable term is exemplified by (2):

$$\text{Var}-SOT, \text{const}, \text{D\_FOT}, \text{computer\_A}; \quad (2)$$

(2) treats the identifier "computer_A", the tag of data type like const and the type tags of the declaration expressions like D_FOT as a specified relation to be saved in storage medium, so that an application program retrieves and calls the identifier "computer_A" by the specific relation, and uses the identifier to replace the parameter Var-SOT in a transformation.

An assignment of DOLE is used in valuation for at least one of the parameters of quantifier, terms, predicates basic logic operators, and types of DOLP by means of setting up a linear relation of the parameter(s) and the input identifiers.

The DOLPE is a formal structure of a type of DOLP, serving in defining the structure of a DOLP, including the atomic structure and composite structure. The type of DOLP: SOP-Statement-Q, as an example introduced in FIG. 4, is constructed by the expressions "(",Q-FOt, Q-SOT, ")", Q-SOP, "(", SOT, FOt, ")".

For the purpose of representing a DOLPE, the embodiments of the present disclosure apply formal structures of the Lambda language, and take the forms of anonymous functions to represent the structure of knowledge organs, e.g., represent a predicate and its parameters, wherein a formal parameter is allowable to be replaced by arguments. (∃x)p(x,X) is an example of DOLP, representing "exists x subjected to the p assertion about X". Due to the anonymity, a function or its inner expressions can be substituted in accordance with multiple-step mappings to implement a transformation into a type of DOLP. Moreover, Lambda expressions hold specifications, including rules such as left placement of parameters, listing the parameters in turn on a scale of restriction of quantifiers.

The embodiments of the present disclosure offer a practicable means that the syntax model, as mentioned in S202, comprises meta-data structures representing the set of mapping relations used in parsing the symbol sequences of reference to recognize and/or generate the goal language which comprises DOLPs.

Objects to be parsed and parsing steps are all formalized in data structures preset in storage medium. Wherein, the objects are lexemes defined by the step S101 and specified in an acceptable form; the parsing steps are generative, which transform the specification-satisfied expressions into a result.

The embodiments of the present disclosure offer a practicable means that the meta-data structure is characterized in terms of Extended Backus-Naur Form (EBNF), so that the meta-data structure is generative automatically by means of parser tools based on EBNF according to a tour in the mappings specified by the meta-data structure.

A mapping of meta-structure in a syntax model is exemplified as following:

$$(\{Const-FOt\}) | (Q\,FOt) \rightarrow Const-SOT$$

It stands for the constant first-order term or quantified variable first-order term in transforming into a constant second-order term. The transforming is expressed in EBNF as follows:

$$Const-SOT-\text{Assignment}-Const-SOT, " = ",$$
$$\text{Identifier} | (" \{ ", \{Const-FOt\}-\varepsilon, " \} ") | (Q, FOt);$$

Wherein, Const-SOT-Assignment is a mediating symbol, representing that the identifier is equipped with a constant second-order ("Const-SOT") attribution by means of the linear relation associated by the assignor "=". In the context latter, "–ε" indicates that the elements in the prior (left) positions are compulsory; in contrast, the elements (Q, FOt) in right (post) positions (without "–ε") are optional. The meta-data structures represented in EBNF cover all the structural forms representing DOLPs. When the structural forms in EBNF satisfy a DOLPE, it completes a compilation of a DOLP.

The embodiments of the present disclosure offer a practicable means that analyzers-tools running the meta-data structures comprise at least one of JavaCC, GCC, and Haskell.

Specifically, the embodiments of the present disclosure offer a practicable means to establish parsing models including a lexical model and a syntax model, which are at least presented by and subjected to the grammars of JavaCC, GCC and Haskell, so are compiled by JavaCC, GCC and Haskell etc., and applied by programs with script styles, finally compiled into DOLP-containing programs.

JavaCC (Java Compiler Compiler) is a parser programmed in Java, GCC (GNU compiler Collection) is also a parser developed by GNU, and Haskell is a standard general pure function programming language. The three all recognize and accept context-free grammars, and transform expressions subjected to the grammars into programs to generate script-described sub-data structures, viz, the object language, therefor implement the mappings represented by EBNF.

The embodiments of the present disclosure offer a practicable means that the meta-data structures recognize and/or generate a child data structure made up of at least one of DOLPE, which comprises the parameters including a predicate with optional one of quantifiers, terms, logical operators, and DOLPEs. When all the units in the DOLPE have mappings to terminal symbols, acquiring a DOLP resulted from the mappings, it will complete recognizing or generating the child date structure of DOLPE, namely completes a parsing a DOLP.

In detail, the DOLPE is either atomic or composite.

Wherein, the formal structure of an atomic quantified FOL proposition is a liner data structure, which includes FOL parameters in EBNF. The formal structure of an atomic quantified FOL proposition is divided into two kinds, which are represented by the type FO-ATOM:

$$FO\_ATOM = FOp\text{-Statement-}Const \mid FOp\text{-Statement-}Q;$$

One is the form as represented by FOp-Statement-Const which serves as a constant parameter, free of quantifiers. to act on constant first-order terms.

Another one is the form as represented by FOp-Statement-Q, which is characterized in that the constant parameter of first-order predicate acts on quantified first-order terms, as the structure (3) shows:

$$FOp\text{-Statement-}Q = [\text{"}(\text{"}, \{Q, \text{Var-}FOt\}\text{-}\varepsilon, [ \quad (3)$$
$$\text{"})\text{"}], \text{"}(\text{"}, FOp\text{-Statement-Pure}, \text{"})\text{"};$$

Wherein, Q indicates a basic quantifier; var-FOt is a variable first-order term, and FOp-Statement-Pure indicates the first-order, quantifier-free predicate statement (the predicate without its parameters), as (4):

$$FOp\text{-Statement-Pure} = FOp, \text{"}(\text{"}, \quad (4)$$
$$[\{FOt\}], [\{FOp\text{-Statement-Pure}\}]\text{"})\text{"};$$

In the embodiment, (∃x)p(x,y) is an example, in which, p is a predicate, x, y are terms representing individuals variable and constant respectively; and x is variable first-order term, and y is constant first-order term.

The formal structure of an atomic first-order DOLPE comprises parameters.

The parameters of an atomic first-order DOLP are composed of first-order terms, represented as FOt, first-order predicates, as FOp, or its statement, the monadic operator ↑ that is one of the empty-representing symbol ε and negation-representing symbol ¬, and the dyadic operator ↓ that is one of logical operators ∧, ∨, →, |.

The parameters FOp, Q, ↓, ↑ are allowed to be denied.

The variable parameter of first-order term Var-FOt is bound by a quantifier Q.

FOp has no binder.

The embodiments of the present disclosure offer a practicable means that at least one of DOLPE comprises an atomic second-order DOLPE, which comprises second-order predicates as constant parameters, and/or quantified first-order predicates as variable parameters, and/or sets of non-quantified first-order predicates as constant parameters. The atomic second-order DOLPE also comprises second-order terms, second-order predicates or its statements—the second-order predicate with terms; the second-order term comprises at least one of constant first-order terms, quantified variable first-order terms, and constants second-order terms.

The atomic second-order proposition, symbolized by SO-ATOM, owns a linear dada structure composed of second-order parameters in EBNF. Formally, SO-ATOM has two kinds of structures as expressed in (5):

$$SO\text{-ATOM} = SOP\text{-Statement-}Const \mid SOP\text{-Statement-}Q \quad (5)$$

One is represented by SOP-Statement-Const that is composed of constant second-order predicates acting on constant no more than second-order terms, predicates or their statements—here the predicates and the terms are all quantifier-free.

Another one is represented by SOP-Statement-Q, as shown in (6), that is composed of a quantified variable first-order predicate acting on quantified first- or variable second-order terms and quantified first-order predicates.

$$SOP\text{-Statement-}Q = [\text{"}(\text{"}], \quad (6)$$
$$(\{Q, \text{Var-}FOt\}, \{Q, \text{Var-}FOp\}, \{Q, SOT\})\text{-}\varepsilon,$$
$$[\text{"})\text{"}], SOP\text{-Statement-Pure};$$

Wherein, SOT represents a second-order term, SOP-Statement-Pure represents a quantifier-free second-order predicate statement, whose formal structure is described as (7).

$$SOP\text{-}Statement\text{-}Pure = (Const\text{-}SOP, " ( ", \{FOt\}, \{FOp\}, \quad (7)$$
$$\{FOp\text{-}Statement\text{-}Pure\}, \{SOT\}, \{SOP\text{-}Statement\text{-}Pure\}, " ) ") |$$
$$(Var\text{-}FOp, " ( ", \{FOt\}, \{FOp\}, \{FOp\text{-}Statement\text{-}Pure\} " ) ");$$

In the embodiments, an instance subjected to (6) is taken as (8):

$$(\neg_\exists X \neg_\forall y \lor p) \, p(X, y) \quad (8)$$

Wherein, ¬ indicates denying, ∃X is transformed from the expression (Q, Var-SOT) of the second-order term bound by a quantifier, ∀p is from (Q, Var-FOp) of the first-order predicate p bound by a universal quantifier, and p(X,y) represents p acting on second order term X and first-order term y.

The characteristics of the formal structure of an atomic second-order include that ([0127]-[0132]):

The highest order of the parameters is the second, including: first-order term FOt, first-order predicate FOp or its statement, second-order term SOT, second-order predicate SOP or its statement, quantifier Q, the monadic operator ↑ and the dyadic operator ↓ that is one of logical operators ∧, ∨, →, |.

The parameters FOp, SOP, Q, ↓, ↑ are allowed to be denied.

The variable parameter of first- and/or second-order term Var-FOt is bound by a quantifier Q.

FOp is allowed to be bound by a quantifier.

SOP has no binder.

A second-order term or predicate is allowed to be expressed in a quantified first-order term or predicate as X=Qx, P=Qp. Wherein, Q is a quantifier. It is also allowed to be expressed in a set of first-order terms (predicates) like Y={y}, R={r}, wherein, x is a first-order term, p is a first-order predicate, {y} is the set of first-order terms, and {r} is the set of first-order predicates.

The embodiments of the present disclosure offer a practicable means that a DOLPE comprises an atomic third-order DOLPE, which comprises third-order predicates as constant parameters, and/or a set of quantified second-order predicates as variable parameters, and/or non-quantified second-order predicates as constant parameters. The atomic third-order DOLPE also may comprise terms, predicates or its statements with no more than third order. Wherein, the predicate statement with third order refers to the third-order predicate with parameters; the third-order term comprises at least one of sets of second-order constant terms, sets of quantified variable second-order terms, and constant third-order terms.

The atomic third-order DOLP, symbolized by TO-ATOM, owns a linear dada structure composed of third-order parameters in EBNF. Formally, TO-ATOM has two kinds of structures as expressed in (9):

$$TO\text{-}ATOM = TOP\text{-}Statement\text{-}Const \,|\, TOP\text{-}Statement\text{-}Q \quad (9)$$

One is represented by TOP-Statement-Const that is composed of constant third-order predicates acting on no more than third-order constant terms, predicates or their statements, and the terms and predicates are all quantifier-free.

Another one is represented by TOP-Statement-Q, as shown in (10), that is composed of a quantified second-order variable predicate acting on quantified no more than three-order variable terms and quantified no more than second-order predicates, as shown in (10):

$$TOP\text{-}Statement\text{-}Q = [" ( "], \quad (10)$$
$$(\{Q, Var\text{-}FOt\}, \{Q, Var\text{-}FOp\}, \{Q, Var\text{-}SOT\},$$
$$\{Q, Var\text{-}SOP\}, \{Q, Var\text{-}TOT\})\text{-}\varepsilon, [" ) "], TOP\text{-}Statement\text{-}Pure;$$

Wherein, Var-TOT represents a third-order term, TOP-Statement-Pure represents a quantifier-free third-order predicate statement, whose formal structure is described as (11):

$$TOP\text{-}Statement\text{-}Pure = \quad (11)$$
$$(Const\text{-}TOP, " ( ", \{FOt\}, \{FOp\}, \{FOp\text{-}Statement\text{-}Pure\}, \{SOT\},$$
$$\{SOP\}, \{SOP\text{-}Statement\text{-}pure\}, \{TOT\}, \{TOP\text{-}Statement\text{-}Pure\},$$
$$" ) ") | (Var\text{-}SOP " ( ", \{FOt\}, \{FOp\}, \{FOp\text{-}Statement\text{-}Pure\},$$
$$\{SOT\}, \{SOP\}, \{SOP\text{-}Statement\text{-}pure\}, " ) ");$$

Wherein, Const-TOP represents the third-order predicate as a constant parameter, Var-SOP represents the third-order predicate as a variable parameter.

In the embodiments, based on the terms and predicates expressions of (10)(11), a generation of the atomic quantified third-order proposition (12) is instantiated as (13):

$$TOP\text{-}Statement\text{-}Q = \text{``}(\text{''}Q\text{-}FQt, Q\text{-}SOT, \text{``})\text{''}, Q\text{-}SOP, \text{``}(\text{''}SOT, \quad (12)$$
$$FOt\text{``})\text{''}$$
$$(\mp x \exists X) \forall P(X, x) \quad (13)$$

Wherein, ⊤x is an instance of the partial-quantifier-bound first-order term transformed from the formal parameter Q-FOt, ∃X is an instance of the existential-quantifier-bound second-order term transformed from the formal parameter Q-SOT, and ∀P is an instance of the universal-quantifier-bound second-order predicate transformed from the formal parameter Q-SOP, X is an instance of second-order term expression SOT, x is an instance of first-order term expression FOt.

An atomic third-order DOLP owns a formal structure composed of the following parameters:

first-order terms FOt, first-order predicates FOp or its statements, second-order terms SOT, second-order predicates SOP or its statements, third-order terms SOT, third-order constant predicates Const-TOP or its statement, quantifiers Q, monadic operators ↑, the dyadic operators ↓.

The parameters FOp, Const-TOP, Q, ↑, and ↓ are all allowed to be denied.

Each variable term Var-FOt or Var-SOT or Var-TOT is bound by a quantifier Q.

The variable predicate Var-FOp, Var-SOP can be bound by a quantifier Q.

The third order predicate TOP has no quantifier-binder.

The following relations are permissible and feasible: X'={QX}, X={Qx}, P={Qp}. Wherein, X', X, x are of third, second, first orders respectively, and P, p are of second, first orders respectively.

A third-order term or/and predicate can be expressed quantified second-order term or/and predicate. This is to say, the form of an expression like X(n+1)=QX(n) is well-formed, wherein n, n+1 indicate the numbers of the order, and a third-order term or/and predicate are allowable to be expressed as sets of second terms or/and predicates, like Y'={Y}, R'={R}, and the quantifications based on the sets like Y'=QY, R'=QR, wherein, Y, R are of second order.

The embodiments of the present disclosure offer a practicable means that a DOLPE is either atomic or composite. The composite DOLPE is generated at least two items of an atomic first-order DOLPE, an atomic second-order DOLPE, and an atomic third-order DOLPE through a logical operation of dual arity in at least one time. The number of an order of a composite DOLPE is the maximum among the numbers of the orders of atomic proposition expressions in the composite DOLPE.

The formal structure of a composite first-order DOLPE is a linear data structure composed of atomic first-order DOLPE in dyadic logic operations in EBNF. It is divided into two kinds of structures: Composition-Const and FO-Composition-Q, as expressed in (14):

$$FO\text{-}COMPOSITION = FO\text{-}Composition\text{-}Const | FO\text{-}Composition\text{-}Q; \quad (14)$$

Wherein, FO-Composition-Q is a type of quantified first-order composite DOLPE, including quantified first-order variable terms {Q, Var-FOT}−ε, and at least two quantifier-free first-order predicate statements FOp-Statement-Pure in a dyadic logic operation, as shown in EBNF in (15).

$$FO\text{-Composition-}Q = (\text{``(''}, \{Q, \text{Var-}FOT\} - \varepsilon, \text{``)''}, [\{\text{``(''}\}], \quad (15)$$

$FOp\text{-Statement-Pure}, \{[\{\text{``)''}\}]\}, [\uparrow], \downarrow, [\{\text{``(''}\}], FOp\text{-Statement-Pure},$ $[\{\text{``)''}\}]\})([\{\text{``(''}\}], \{Q, \text{Var-}FOT\} - \varepsilon, [\text{``)''}], [\{\text{``(''}\}],$ $FOp\text{-Statement-Pure}, \{[\{\text{``)''}\}]\}, [\uparrow], \downarrow, [\{\text{``(''}\}], \{Q, \text{Var-}FOT\}], [\text{``)''}],$ $[\{\text{``(''}\}], FOp\text{-Statement-Pure}, [\{\text{``)''}\}]\});$ In the embodiments, the formal structure of a composite first-order DOLPE is a linear data structure composed of atomic first-order DOLPE in dyadic logic operations in EBNF. An example generated from (15) is given as follows:

$$((\exists x, \forall y)p(x, y) \land (\forall y, \neg \forall z)q(y, z)) \rightarrow (\exists x, \forall z)\neg r(x, z)$$

It shows a transformation from the dyadic predicate p(x,y) and q(y,z) in conjunction (∧) to the negation ¬r(x,z), and the terms are quantified.

The characteristics of formal structure of a composite first-order DOLPE comprises:

A composite first-order DOLPE is composed of atomic first-order DOLPE in dyadic logic operations symbolized by ↓. The dyadic logic operation can be expressed in a logic operation of any two atomic DOLPE with first-order parameters in logic operations, and the results of these operations are allowable to be new dyadic logic operations.

The formal structure of a composite second-order DOLPE is a linear data structure composed of atomic second-order DOLPEs in dyadic logic operations in EBNF. It is classified into two kinds as shown in (16):

$$SO\text{-COMPOSITION} = \quad (16)$$

$$SO\text{-COMPOSITION-}Const | SO\text{-Composition-}Q;$$

Wherein, SO-Composition-Const is a composite second-order DOLPE with constant (quantifier-free) parameters, SO-Composition-Q is a composite second-order DOLPE with quantified-variable parameters, as shown in EBNF in (17).

$$SO\text{-Composition-}Q = (\text{``(''}, \{Q, \text{Var-}FOt | Q, \text{Var-}SOT | Q, \text{Var-} \quad (17)$$

$FOp\} - \varepsilon, \text{``)''}, [\{\text{``(''}\}], FOp\text{-Statement-Pure} | SOP\text{-Statement-Pure},$ $\{[\{\text{``)''}\}]\}, [\uparrow], \downarrow, [\{\text{``(''}\}], SOP\text{-Statement-Pure}, [\{\text{``)''}\}]\})|([\{\text{``(''}\}],$ $\{Q, \text{Var-}FOt | Q, \text{Var-}SOT | Q, \text{Var-}FOp\} - \varepsilon, [\text{``)''}], [\{\text{``(''}\}], FOp\text{-}$ $\text{Statement-Pure} | SOP\text{-Statement-Pure}, \{[\{\text{``)''}\}]\}, [\uparrow], \downarrow,$ $[\{\text{``(''}\}], \{Q, \text{Var-}FOt | Q, \text{Var-}SOT | Q, \text{Var-}FOp\}], [\{\text{``)''}\}],$ $[\text{``(''}\}], FOp\text{-Statement-Pure} | SOP\text{-Statement-Pure}, [\{\text{``)''}\}]\});$ For example, (17) generates the following instance:

$$(\neg \exists X \neg \forall Y \forall p)(X, Y) | (\neg \exists X \neg \forall Y \exists p) \exists p(X, Y)$$

The instance is a composite second-order DOLP, which is composed of two atomic second-order DOLP (¬∃X¬∀Y∀p)(X,Y) and (¬∃X¬∀Y∃p)∃p(X,Y) in "negation of implication".

The formal structure of a composite second-order DOLPE is characterized in that:

A composite second-order DOLPE is composed of atomic second-order DOLPE in dyadic logic operations symbolized by ↓. The dyadic logic operation can be expressed in a logic operation of any two atomic DOLPEs with second-order parameters in logic operations, and the results of these operations are allowable to be new dyadic logic operations.

The formal structure of a composite third-order DOLPE is a linear data structure composed of atomic third-order DOLPEs in dyadic logic operations in EBNF. It is classified into two kinds: the composite third-order DOLPE with constant (quantifier-free) parameters: TO-Composition-Const, and ones with variable parameters which can be quantified by quantifiers Q: TO-Composition-Q, as shown in (18).

$$TO\text{-COMPOSITION} = \quad (18)$$

$$TO\text{-COMPOSITION-}Const | TO\text{-Composition-}Q;$$

Wherein, the formal structure of TO-Composition-Q in EBNF is shown in (19).

$$TO\text{-Composition-}Q = (\text{``(''}, \{Q, \text{Var-}FOT|\text{Var-}SOT|\text{Var-}TOT \quad (19)$$

$$|\text{Var-}FOp|\text{Var-}SOP\} - \varepsilon, \text{``)''}, [\{\text{``(''}\}]), SOP\text{-Statement-Pure}|TOP\text{-}$$

$$\text{Statement-Pure}, \{[\{\text{``}\}''\}]\}, [\uparrow], \downarrow, [\{\text{``(''}\}), SOP\text{-Statement-}$$

$$\text{Pure}|TOP\text{-Statement-Pure}, [\{\text{``}\}''\}]\})|([\{\text{``(''}\}), [\{Q, \text{Var-}FOT$$

$$|\text{Var-}SOT|\text{Var-}TOT|\text{Var-}FOp|\text{Var-}SOp\}], [\text{``}]\text{''}], [\{\text{``(''}\}), SOP\text{-}$$

$$\text{Statement-Pure}|TOP\text{-Statement-Pure}, \{[\{\text{``}\}''\}]\}, [\uparrow], \downarrow, [\{\text{``(''}\}), \{Q,$$

$$\text{Var-}FOT|\text{Var-}SOT|\text{Var-}FOp|\text{Var-}SOP|\text{Var-}TOP\}), [\text{``}]\text{''}], [\{\text{``(''}\}),$$

$$SOP\text{-Statement-Pure}|TOP\text{-Statement-Pure}, [\{\text{``}\}''\}]\});$$

For example, (19) generates an instance as follows.

$$(\neg \exists X' \neg \forall Y' \forall P) P(X', Y')|(\neg \exists X' \neg \forall Y' \exists p) \exists p(X', Y')$$

It contains third-order quantified parameters sequences $(\neg\exists X'\neg\forall Y'\forall P)$ specifying the scale acting on second-order predicate statement P (X', Y') and quantified third-order parameters sequences $(\neg\exists X'\neg\forall Y'\exists p)$ specifying the scale acting on third-order predicate statement $\exists P$ (X', Y') in negation of implication.

The formal structure of a composite third-order DOLPE is characterized in that:

A composite third-order DOLPE is composed of atomic third-order DOLPE in dyadic logic operations ↓. The dyadic logic operation can be expressed in a logic operation of any two atomic DOLPEs with third-order parameters in logic operations, and the results of these operations are allowable to be new dyadic logic operations.

The embodiments of the present disclosure offer a practicable means that at least one DOLPE comprises an atomic DOLPE with n order or/and n+1 order or/and n+2 order, wherein, n is a positive integer number.

Thereof, a (n+2)-order predicate acts on no higher than (n+2)-order terms.

A (n+2)-order predicate comprises at least one of quantified (n+1)-order variable predicates, sets of (n+1)-order constant predicates, (n+2)-order predicates.

A (n+2)-order term comprises at least one of quantified (n+1)-order variable terms, sets of constant (n+1)-order terms, constant (n+2)-order terms.

The n-order term describes individuals (even the objects to be described is a set, they are treated as an individual, not to be partitioned further in the n-order expressions).

The (n+1)-order term X describes the n-order-term-representing individual sets X={x}.

The (n+2)-order term X' describes the (n+1)-order-term-representing individual sets X'={X}.

The n-order predicate describes single operations (even the operations to be described are multiple, they are treated as a single one, not to be partitioned further in the n-order expressions).

The (n+1)-order predicate P represents the sets of n-order predicates like the form P={p, q, r}.

The (n+2)-order predicate P' represents the sets of (n+1)-order predicates like the form P'={P}.

The differential order means one(s) among n, n+1, n+2 orders in series, where n is a natural number n≥1. The embodiments of the present disclosure particularly improve the logic programming languages with the differential order in 1 order difference. "The differential-order logic programming language" is said to be such logic programming languages that represent and/or compute expressions with different orders in one computing circumstance (such as one expression, one instruction sets or one executable file). The improvements include: quantifiers not only bind terms, like ∃x, ∀y, but also bind predicates, like ∃P, ∃p; the differential orders are represented and computed in one integrating circumstance (e.g. one programming language), or in different programming languages by compilation and further by inter-interpretations and applications between different programming languages with differential logic.

The embodiments of the present disclosure offer a practicable means that a DOLPE comprises a composite DOLPE, which is generated from at least two of atomic first-order DOLPE, atomic second-order DOLPE, and atomic third-order DOLPE in logic operations at least one time.

And that n-, (n+1)-, (n+2)-order composite DOLPEs are treated by way of treating first-, second-, third-order composite DOLPEs.

The embodiments of the present disclosure offer a practicable means to decrease the order of a higher-order parameter upon an instruction in the case that the higher-order parameter is assigned by a lower-order parameter;

Wherein, the decrease of order comprises:

Synthesizing the first quantifier with n+1 order and second quantifier with n order to be the third quantifier with n order in the case that the variable parameter with n+1 order is substituted by the second-quantifier-bound variable parameter with n order.

Wherein, the variable parameter comprises variable predicates and variable terms.

The decrease of order is given in detail:

Let $Q^{(n+1)}$ be a (n+1)-order quantifier, and $Q^{(n)}$, n-order. Given a quantified set $X^{(n+1)}=\{Q^{(n)}x\}$, define decreasing the order of $Q^{(n+1)}X$, expressed as $Q^{(n+1\to n)}x$, as turning the higher-order quantified objects into the lower-order quantified objects in accordance with operational rules of the decreasing order logic.

Specifically, for a product of a second-order quantifier and a first-order quantifier, as symbolized as $Q^{(n+1)}*Q^{(n)}$, its operational rules of the decreasing order logic is given by the table in FIG. 5 to FIG. 8 with different-order quantifiers for negation (¬).

As a variable set with higher order and its quantified elements with an adjacent lower order in a relation representing each other, the two variables can be operands for the decrease of order. For example, given $X=Q^{(1)}x$, the decrease of order $Q^{(2)}X$, is formulized as the formula (20):

$$Q^{(2\to 1)}X = \bigcup_{X_1}^{Q^{(2)}} \bigcup_{x_1}^{Q^{(1)}} Q^{(2)}Q^{(1)}\{x\} = \bigcup_{X_1}^{Q^{(2)}} \bigcup_{x_1}^{Q^{(1)}} \{Q^{(2)}*Q^{(1)}/x\} \quad (20)$$

Wherein, $Q^{(2)}$ $Q^{(1)}$ are the products of the two order-adjacent quantifiers of X and x respectively. The rules of the operations of the production are given in FIG. 5 to FIG. 8, $Q^{(2)}*Q^{(1)}/x$ is the fuzzy representation of x, and $Q^{(2)}*Q^{(1)}$ is the membership.

Suppose X={∀x}, ∃X can be expressed by order-decreased x according to FIG. 5. Therefore, (∃X)P(X, y) can be expressed as the following:

$$(\exists X)P(X, y) = (\exists^{(2 \to 1)} X)P(X, y) = (\exists^{(2)} * \forall^{(1)} x)P(x, y) = (\exists x)P(x, y)$$

The embodiments of the present disclosure deliver a logic design to decrease the order of the product of the quantifiers with adjacent differential orders, enabling quantified sets and quantified individuals to represent each other and calculate the quantified relations between them.

For expounding the embodiments of the present disclosure, a specific application instantiating or using the embodiments is given below, to show enhancing knowledge representation and application with respect to functions, data-collections, and effectiveness of deduction through compiling DOLEs.

Assume that there are many sensor arrays, each of the sensor owns multiple sense units, and each unit has various functions representing lines and angles, to make propositional knowledge of triangle generated from the functions in units, of lines and angles, and further to draw graphics according to parameters in the propositional knowledge.

Suppose that there is a physical object of a triangle, which will be drawn in an array by means of computing points, lines, and angles by the functions.

Suppose that there is such a task: for any array, where sets of line functions and sets of angle functions function, if the features of a triangle emerge in the light of the results computed by units through functions of lines and angles, then, an assertion should be made that the triangle had been recognized to trigger a pixels action D based on the recognized objects. It is required that the program uses only two quantifiers ∀ and ∃, which are commonly used in FOL, and expresses in Lambda or EBNF. Suppose that separation symbols such as (,), {,}, logical operators →, ∧, ∨, ¬, assignor =, addition symbol Plus, and mathematical constant π are all recognizable and computable, the functions of lines and angles are also computable for drawing graphics.

S401: Define FOL constants, a function of processing pixels d, whose value represents a point (holding a unique pair of coordinates x,y).

Define first-order integer variable i,j,k∈ {<x1,y1>,<x2, y2>, . . . }≤D, which are the coordinate values, i≠j≠k.

Define a first-order variable predicate l(d(m), d(n)), which represents a line segment from points d(m) to d(n), m=n.

Define a variable first-order predicate r(l, l), which is an angle fixed by the two line segments l and l, representing a function generated (applied) by a one sensor unit.

Define a variable second-order predicate D={d(x)}, which represents a set of point coordinates in one sensor.

Define a variable second-order term R=∃r, which represents a quantification of angle function r generated (applied) by a sensor.

Define a variable second-order term L=∃l, which represents a quantification of line segment function l generated (applied) by a sensor.

Define a variable second-order predicate (∃l∃r∃Tri)Tri (∀l, ∀r), which represents "exists l and exists r constituting a triangle", generated (applied) by a sensor.

Define a variable third-order predicate (∀L∀R∃D) TriSet (L, R, D) to present "for all sets L and all sets R, exist set D such that L, R, and D constitute at least one triangle function Tri generating a set of triangle TriSet", generated (applied) by an array of sensors.

The programs of completing the task in Lambda language is given as follows.

$$(\exists l \exists r \exists d \exists Tri)((2\pi = \text{Plus}(r(1(d(i), d(j)), 1(d(j), d(k))), r(1(d(j), \quad (21)$$
$$d(k)), 1(d(k), d(i))), r(1(d(j), d(i)), 1(d(i), d(k)))) \to Tri(1, r, d))$$

(21) means that if exists line segment function l and angle function r, satisfying the condition of implication, there will be a triangle function Tri; the condition includes: the three points d(i), d(j), and d(k) construct three lines of segments l, any two of {l} construct an angle r, and the sum of {r} equal 2π.

$$(\forall L \forall R \exists D)(TriSet(L, R, D) \to \text{Action}(D)) \quad (22)$$

(22) means that for all the sets L and all the sets R, there exists a set D such that L, R, and D construct at least one triangle function Tri to compose a triangle set TriSet, which trigger an Action of D.

S402: Treat the expressions (21) and (22) as the object languages to be compiled, the following symbols are determined as lexemes according to EBNF and given domain of symbols:

$$\{\forall, \exists, \to, |, =, \wedge, 0, 1, 2, 3, \pi, (,), \{, \}, ; d, 1, r L, R, D, i, j, k, \text{Plus},$$
$$Tri, TriSet, \text{Action}\}$$

S403: Build a syntax model, including establishing a set of mapping relations between semantic classification tokens and lexemes as exemplified by FIG. 9, particularly between semantic classification tokens of parameters of terms or/and predicates and lexemes, as exemplified in FIG. 10, to parse the input lexemes. The relations are formed with the help of the data structures of the type tags of the declaration expressions and the tag of data type. For example, a point function d is declared as a first-order predicate with the help of (1) as follows, excepting the term parameter t that will be replaced by the predicate parameter p:

$$\text{Var-}FOp = \text{var D\_FOp } d;$$

S404: Determine the relation between parameters and a type of DOLP according to the syntax model as shown in FIG. 11.

FIG. 9 to FIG. 11 demonstrate the results compiled codes, namely, the output DOLPs (atomic third-order propositions and a composite third-order propositions) in programming by means of selecting the symbols, which fit the formal structures specified by the syntax model and expressed in EBNF.

Further, when (21) and (22) are compiled, there will be a result of a modus ponent Action(D), namely "a pixels' action D triggered by a recognized object—the triangle." This procedure shows that from compiling the knowledge to generate an instruction triggering Action D, a unification of two DOLEs is adopted in decreasing the higher order of two inter-presenting quantifier-bound parameters (with differential orders) to synthesize them. In detail, as compiling (21) and (22), the inter-presenting quantifier-bound parameters differential-order terms D and {d}, differential-order predicates L and l, differential-order predicates R and r, differential-order predicates {D}, {L}, {R}, and their quantified terms QD, QL, QR, and differential-order predicates TriSet and ∃Tri are all determined, and each pair of the quantified parameters with the different order are computed by the rule of decreasing order. The computations and the results are given in FIG. 12.

FIG. 12 is the articulation of decreasing order of (∀L∀R∃D) (TriSet(L, R, D)) in the expression (22), equivalent to (∃l∃r∃d∃Tri)Tri (l, r, d), confirming which will certainly trigger (∀L∀R∃D) (TriSet(L, R, D)) to execute (∃D)Action(D), completing the present task. Where, (∃l∃r∃d∃Tri)Tri (l, r, d) and (∀L∀R∃D) (TriSet(L, R, D)) are unified through decreasing their orders.

The completion of the present task shows an example of representation and application of DOLE knowledge with DOL computations, which selects the symbols in an object language and runs the mappings satisfying formal structures of the preset lexical model and syntax model to compile DOLE knowledge.

Compared with the existing logic programming languages, the embodiments of the present disclosure have the advantage, of doing which the prior art is incapable, especially in representing and computing the DOLEs. In view of FIG. 9, the symbol domains of the expressions (21) and (22) belong to the domains of the existing logic programming languages, nevertheless, the existing logic programming languages have no function compiling the DOLEs which lead to the similar results expressed in FIG. 9; further, the similar results like FIG. 11 will not emerge, not to mention the expressions (21) and (22) are computed and executed. This is due to that the prior art cannot compile and deduct expressions of quantified predicates and terms with differential orders in one integrating computing environment. Specifically, with the limitations, ∃l∃r, ∀L=∀(∃l), and ∀R=∀(∃r) are not representative and computable, such that individuals l and r are final, not forming the sensor's knowledge which requires second-order representations, and not forming the array's knowledge which requires third-order representations. It is based on the second- and third-order representations that segments' and angles' functions are compounded to be a triangle's function, as FIG. 13 shows. Where, 4 sensors, each one adopts own line segment function l and angle function r through its own units, cognize one identical object, and further generate the different graphics of even empty locals of the triangle of the object. Thereto, FIG. 13-(C) and FIG. 13-(D) show the possible cases which cannot form a triangle due to adopting only FOL expressions. Also, the prior art cannot composite the 4 results to generate the third-order knowledge (∀L∀R∃D) (TriSet(L,R,D)) which represents a set of knowledge like "exists at least one array of the sensors representing a triangle based on fuzzy computations", including the cases of FIG. 13-(C) and FIG. 13-(D) which serve as forming a triangle composed of the two units' knowledge. In comparison with these results of the prior art, the embodiments of the present disclosure integrate sets of segments' and angles' functions ∃l and ∃r in first-order propositional knowledge representation on the levels units, carrying out a quantified computing ∀{L={∃l}} and ∀{R={∃r}} to generate third-order propositional knowledge (∀L∀R∃D) (TriSet(L,R,D)) on the levels of multiple arrays, finally compound a comprehensive knowledge of the triangle object. This procedure has applied the decreasing order computing, and achieved acknowledge "for all sets L and all sets R, exist set D such that L, R, and D constitute at least one triangle function Tri generating a set of triangle TriSet", including "exist fuzzy relations (quantified relations) corresponding to unifying the local knowledge in the two units such as FIG. 13-(C) and FIG. 13-(D) to form the triangle knowledge".

FIGS. 14-A and 14-B compare the difference of compilations and results between the prior art and the embodiments of the present disclosure.

FIG. 14-A displays that the prior art cannot compile quantified predicates with inference, but compile only individuals, thus not compiling the sets of the knowledge of individual functions but at most saving them separately. In the present example, different segment function l1, l2 and l3, and different angle function r1=60, r2=60 and r3=60 compound a comprehensive knowledge D, namely the fuzzy knowledge ∃D on the base of the first-order parameter l and r, the second-order parameters ∃l∃r, and the third-order parameters ∀L∀R∃D.

The embodiments of the present disclosure provide the technical approaches parsing the lexemes to acquire DOLPEs or certain interruption information in the compiling. The DOLPEs are either of low order or of high order. The approaches have solved the problems that DOLEs cannot be compiled by the prior art.

Figure 15:
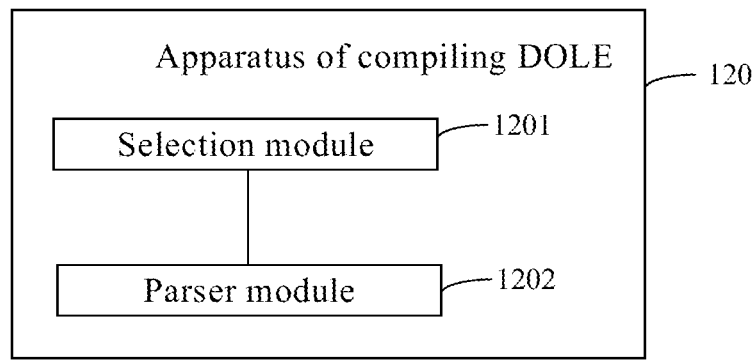
FIG. 15 is a schematic diagram of an apparatus of compiling DOLE, exemplified by embodiments of the present disclosure.

The embodiments of the present disclosure provide an apparatus 120 of compiling DOLEs, as shown in FIG. 15, comprising a selection module 1201 and a parser module 1202. The selection module 1201 and the parser module 1202 are software modules embedded and/or saved in one or more storage mediums including memories, repositories, etc., and executable by one or more processors coupled with the one or more storage mediums.

Wherein, the selection module 1201 is used in obtaining an object language to be compiled, and selecting a symbol sequence of reference from the object language as lexemes according to the domain of terminal symbols specified by a lexical model.

Wherein, the parser module 1202 is used in parsing the lexemes to acquire a result of either a DOLPE or certain interruption information in the compiling. A DOLPE is either of low order or of high order. The low-order DOLPE is a FOL proposition expression, and the high-order DOLPE is a second-order or higher-order logic proposition expression.

With the similar rudiments, the device with the detailed functions of compiling DOLEs provided by the embodiments of the present disclosure correspondingly implements the method made up of the practicable means given in the embodiments.

The embodiments of the present disclosure select the symbol sequences of reference from an object language as lexemes according to the domain of terminal symbols specified by a lexical model, build a syntax model for the lexemes to cognize and/or generate a DOLP, and parse the lexemes to output results which are either a DOLP or certain interruption information in the compiling. Wherein, the DOLP is one of either of low-order DOLP or of high-order DOLP. Hence the embodiments of the present disclosure have solved the problems of compiling DOLEs, unsettled in the prior art and the existing technical designs.

The embodiments of the present disclosure provide an electronic device, comprising an information storage medium, a processor and programs saved in the storage medium. The processor implements the processes specified by the DOLE's compilation method as stated in S101 to S102. In comparison with the prior art, the embodiments of the present disclosure can select the symbol sequences of reference from an object language as lexemes according to the domain of terminal symbols specified by a lexical model, build a syntax model for the lexemes to cognize an/or generate DOLPs, parse the lexemes to output results which are either a DOLP or certain interruption information in the compiling. As a consequence, the embodiments of the present disclosure have solved the problems compiling DOLEs, which cannot be recognized and/or generated, viz. compiled in reality, by the prior art.

Figure 16:
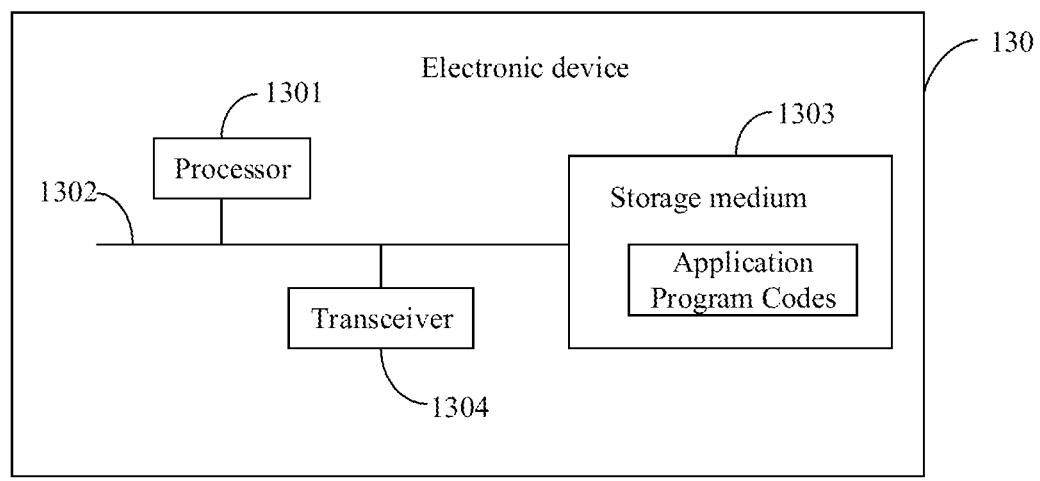
FIG. 16 is a schematic diagram of an electronic device of compiling DOLE, exemplified by embodiments of the present disclosure.

In an optional embodiment of the present disclosure, an electronic device illustrated by 130 is provided as shown in FIG. 16, which comprises a processor 1301 linked to a storage medium 1303, say, through a bus. Optional, the electronic device 130 may include a transceiver 1304 for data interchange with other electrical transceivers, such as data sending or/and receiving. It should be pointed out that the transceiver 1304 may designed to be multiple in applications. The structure of electronic device 130 does not mean a limitation to the embodiments of the present disclosure.

The processor 1301 can be chosen as anyone or the combinations of CPU (Central Processing Unit), a DSP (Digital Signal Processor), ASIC (Application Specific Integrated Circuit), FPGA (Field Programmable Gate Array) or/and other programable logic units, transistor devices, hardware parts, logic designs, modules and circuits realizing or implementing the embodiments of the present disclosure. The processor 1301 can be designed as a combination of computations, for example, a combination of one or many micro-processors, with or without DSP.

The bus 1302 comprises a channel transmitting information between the above-mentioned units. The bus 1302 can be PCI (Peripheral Component Interconnect) or EISA (Extended Industry Standard Architecture), and is divided into address buses, data buses, and control buses. For an easy illustration, one line is symbolized as the bus, but not meaning only one or one kind of bus always.

The storage medium 1303 can be a ROM (Read Only Memory) or a static store for saving static information or instructions. RAM (Random Access Memory) or a dynamic store for saving dynamic information or instructions, EEPROM (Electrically Erasable Programmable Read Only Memory), a CD-ROM (Compact Disc Read Only Memory) or the other optical disc storage (including compressed optical discs, laser discs, optical discs, digital general-purpose discs, Blu-ray discs, etc.), disk storage media, other magnetic storage devices, data and/or programs repositories, or any other media capable of carrying or storing computer programs that can be read by a computer, not limited here.

The storage medium 1303 is used to save the programs which implement the embodiments of the present disclosure, and are to be controlled and executed by a processor 1301.

Wherein, the electronic device includes, but is not limited to: mobile terminals such as mobile phones, laptops, PADs, etc., as well as fixed terminals such as digital TVs, desktop computers, etc.

The embodiments of the present disclosure provide a non-transitory computer-readable storage medium, where programs are embedded and/or saved to process the processes with the contains of the embodiments of the method of the present disclosure.

The embodiments of the present disclosure provide a kind of computer programs or program products, comprising computer instructions embedded and/or saved in the computer-readable storage medium. A control unit or a processor accesses the instructions, then the processor executes the instructions to complete the following steps:

obtaining an object language to be compiled, from which symbol sequences of reference are selected as lexemes according to the domain of terminal symbols specified by a lexical model; and parsing the lexemes to acquire a DOLP or interruption information; thereto, a DOLP is one of either low order or high order.

It should be noted that, in the above embodiments, the above expressions (1) to (15) are the creation of the data structure in the computer (compiler or its improved product), and the DOLPs obtained after parsing the lexemes are applied to a computer, and executed by a computer's compiler or its improved modules, the syntax models for generating DOLPs are nested in a machine system as the meta-data structure represented in EBNF, relating to the hardware as any compiler's relating the hardware.

The disclosure expands the compiling function of the computer, so that it can compile more knowledge representations, and improves the first-order logical expressions and a few high-order logical expressions that can only be compiled locally and separately in existing computers, to make them compiled in an integrated computing environment, thus improving the computing efficiency.

The present claims, description, and drawings the terms "first" "second", "1" "2" etc. for stating or introducing items in the contexts are used for discriminating the similar items, not necessarily mean the order. It should be appreciated that the mentioned items by the terms are allowable to be replaced under some proper cases.

It should be appreciated that the arrows are applied to illustrate a flow in the drawings. However, an embodiment is not limited to the succession referred by the arrows. Unless a specific statement, the process, procedures, or steps, partly or completely, in embodiments of the present disclosure can be implemented on demands, no limitation in the present disclosure.

The above description is only the optional schemes. It should be appreciated that for the specialists in the fields, what is not seceded from the technical conception of the present disclosure, and by means of the technical solutions of the present disclosure, belongs to the categories for protection.

What is claimed is:

1. A method for compiling differential-order logic expressions (DOLEs), the method executable by one or more processors to:

obtaining an object language to be compiled, and selecting a symbol sequence of reference from the object language as selected lexemes according to a domain of terminal symbols specified by a preset lexical model;

creating a set of semantic classification tokens used for mapping relations between the semantic classification tokens themselves, between the semantic classification tokens and lexemes;

building a syntax model, comprising: establishing a set of mapping relations based on the mapping relations between the semantic classification tokens themselves, between the semantic classification tokens and the lexemes;

applying the syntax model to parse the selected lexemes, comprising: recognizing and/or generating target mapping relations of the selected lexemes and corresponding ones of the sematic classification tokens conforming to the syntax model; wherein the corresponding ones of the semantic classification tokens in the target mapping relations serve as mediating symbols and constitute parameters of a differential-order logic proposition (DOLP);

determining a type of a DOLP expression (DOLPE) according to the corresponding ones of the semantic classification tokens and the parameters of the DOLP; and transforming the type of the DOLPE into terminal symbols thereby to obtain the DOLP used for enhancing knowledge representation and deduction of the computer; wherein the DOLP is at least one of a low-order DOLP and a high-order DOLP, the low-order DOLP is a first-order logic (FOL) proposition, and the high-order DOLP is a second-order or higher-order logic proposition, wherein at least one DOLPE comprises atomic n-order, (n+1)-order, (n+2)-order DOLPEs, n is a positive integer number;

a (n+2)-order predicate acts upon terms with no more than (n+2) order;

the (n+2)-order predicate comprises at least one of quantified variable (n+1)-order predicate parameters and a set of constant (n+1)-order predicate parameters;

a (n+2)-order term parameter comprises at least one of quantified variable (nt+1)-order term parameters and a set of constant (n+1)-order term parameters, and the method executable by the one or more processors further to:

decreasing order of parameters by an instruction when quantifiers with high and low order binding one term or predicate coexist in an expression, the decreasing order comprises:

unifying (n+1)-order and n-order quantifiers into a n-order quantifier when a parameter bound by a (n+1) order quantifier is solely assigned by a parameter with a n-order quantifier;

transforming the parameter bound by the (n+1) order quantifier into an assigned n-order parameter, thereof the parameter is either a variable predicate or a variable term.

2. The method as claimed in claim 1, wherein the set of mapping relations in the syntax model represents parsing objects and parsed results, and elements in the set of mapping relations represent mapping relations of the DOLEs;

the transformation of the type of the DOLPE into the terminal symbols thereby to obtain the DOLP comprises:

constructing a grammar tree based on the set of mapping relations; treating the type of the DOLPE as a root node, and treating corresponded elements in the set of mapping relations from the root node, as child nodes which include at least one of predicates, terms, quantifiers, types of the DOLP, and logic operators in representing or composing the DOLP;

wherein when transformations of the mediating symbols started from the root node by the set of mapping relations completely achieve the terminal symbols, a compilation of the DOLP is completed;

when transformations of mediating symbols started from the root node by the set of mapping relations do not completely achieve the terminal symbols, namely, mapped results of nodes of the grammar tree according to the mapping relations in the set of mapping relations do not cover required semantic classification tokens or lexemes, interruption information is output.

3. The method as claimed in claim 2, wherein the DOLEs comprise at least one of a differential-order logic declaration expression (DOLDE), a differential-order logic assignment expression (DOLAE), and a differential-order logic proposition expression (DOLPE);

wherein, the DOLDE is a linear structure made up of a declarator, a type tag of an identifier, and/or parameters of expressions, used in composing and/or transiting a relation between the type tag of the identifier and the parameters of the expressions, listing the relation into the set of mapping relations, which is employed in substituting the type tag for lexemes marked by the type tag in parsing, and impart the lexemes marked by the type tag with attributions of the parameters;

wherein, the DOLAE is a linear structure made up of declared and user-input parameters of the DOLEs, an identifier, and an assignor, used in treating an assigning structure and an assigned structure as a mapping relation to be listed in the set of mapping relations for substituting assigned parameters for the DOLEs according to the set of mapping relations in parsing; and wherein, the DOLPE represents structure and composition of a type of the DOLP, thereof the structure includes an atomic DOLP or a composite DOLP; and the DOLP is subjected to forms of Lambda language.

4. The method as claimed in claim 1, wherein a parsing model including the syntax model comprises meta-data structures representing the set of mapping relation, the meta-data structures are used in parsing the symbol sequence of reference to generate a goal language which comprises the DOLP.

5. The method as claimed in claim 4, wherein the meta-data structures are in terms of extended Backus-Naur Form (EBNF).

6. The method as claimed in claim 5, wherein analyzers-tools accessing the meta-data structures comprise at least one of JavaCC, GCC, and Haskell.

7. The method as claimed in claim 4, wherein the meta-data structures recognize and/or generate a child data structure made up of the at least one DOLPE; the at least one DOLPE comprises parameters which include a predicate parameter with one of quantifiers, terms-parameters, logical operators and a DOLPE type; the DOLPE type is either atomic or composite; when all units in the at least one DOLPE have mapping relations to terminal symbols, the DOLP resulted from the mapping relations is acquired, thereby completing recognizing and/or generating the child date structure of the DOLPE, namely completing parsing the DOLP.

8. The method as claimed in claim 7, wherein the at least one DOLPE comprises an atomic second-order DOLPE with no-more-than-second-order predicate or its statement;

wherein a second-order predicate comprises at least one of constant parameters of the second-order predicate, quantified first-order predicates, sets of constant parameters of a first-order predicate; a statement of the second-order predicate of an atomic DOLP is a predicate that it owns parameters including a second-order term;

the second-order term comprises at least one of first-order or second-order constant terms, and quantified first-order variable terms.

9. The method as claimed in claim 7, wherein the at least one DOLPE comprises an atomic third-order DOLPE with a no-more-than-third-order predicate or its statement;

wherein a third-order predicate comprises at least one of constant parameters of the third-order predicate, sets of quantified second-order predicates, and sets of constant parameters of a second-order predicate; a statement of the third-order predicate of an atomic third-order DOLP is a predicate that it owns parameters including a third-order term;

the third-order term comprises at least one of constant third-order terms, sets of constant second-terms, and sets of variable quantified second-order terms.

10. The method as claimed in claim 7, wherein the at least one DOLPE making up the child data structure comprises a composite DOLPE generated by at least two items of an atomic first-order DOLPE, an atomic second-order DOLPE, and an atomic third-order DOLPE through a logical operation of dual arity in at least one time; the number of an order of the composite DOLPE is a maximum among numbers of orders of atomic DOLPEs in the composite DOLPE.

11. The method as claimed in claim 7, wherein the at least one DOLPE comprises a composite DOLPE; the composite DOLPE is generated by at least two ones of an atomic n-order DOLPE, an atomic (n+1)-order DOLPE, and an atomic (n+2)-order DOLPE through a logical operation of dual arity in at least one time.

12. The method as claimed in claim 1, further comprising:
implementing representation and deductions of knowledge of a physical object based on the DOLP, and drawing the physical object after the representation and deductions of knowledge.

13. The method as claimed in claim 1, further comprising: generating an instruction after obtaining the DOLP, and in response to the instruction, recognizing a physical object and drawing the recognized physical object for displaying.

14. The method as claimed in claim 13, wherein the instruction is used in compilers as machine instructions for circuits in a hardware.

* * * * *